(12) United States Patent
Crysel et al.

(10) Patent No.: US 7,921,031 B2
(45) Date of Patent: Apr. 5, 2011

(54) CUSTOM SURVEY GENERATION METHOD AND SYSTEM

(75) Inventors: Kirsten S. Crysel, Kennesaw, GA (US); Lori Kay Simonson, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 11/564,533

(22) Filed: Nov. 29, 2006

(65) Prior Publication Data

US 2008/0126173 A1    May 29, 2008

(51) Int. Cl.
 *G06F 17/30* (2006.01)
(52) U.S. Cl. .......................................................... 705/10
(58) Field of Classification Search .................. 705/7, 10
 See application file for complete search history.

(56) References Cited

U.S. PATENT DOCUMENTS

| | | | |
|---|---|---|---|
| 6,093,026 A * | 7/2000 | Walker et al. ................. | 434/322 |
| 6,795,828 B2 | 9/2004 | Ricketts | |
| 7,644,006 B2 * | 1/2010 | Casati et al. ...................... | 705/7 |
| 2001/0047274 A1 * | 11/2001 | Borton ............................... | 705/1 |
| 2002/0052774 A1 | 5/2002 | Parker et al. | |
| 2005/0060219 A1 * | 3/2005 | Deitering et al. ............... | 705/10 |
| 2005/0193333 A1 * | 9/2005 | Ebert ............................ | 715/517 |
| 2006/0122876 A1 * | 6/2006 | Von Schweber et al. ....... | 705/10 |

FOREIGN PATENT DOCUMENTS

| | | |
|---|---|---|
| EP | 1215598 A1 * | 11/2000 |
| WO | WO 0068861 A2 * | 11/2000 |

OTHER PUBLICATIONS

Barua "Making E-Business Pay: Eight Key Drivers for Operational Success", Dec. 2000, IEEE, pp. 22-30.*

* cited by examiner

*Primary Examiner* — Romain Jeanty
(74) *Attorney, Agent, or Firm* — Schmeiser, Olsen & Watts; John R. Pivnichny

(57) ABSTRACT

A custom survey generation method and system. The system comprises a computing apparatus comprising a list of business processes, reporting outcomes, and groups of questions. The computing system presents to a user the list. The computing system receives from the user a selection for a business process and an associated reporting outcome from the list. The computing system generates a custom survey for the user in response to the selection. The custom survey comprises a first group of questions associated with the associated reporting outcome. The computing system receives from the user a response to each question of the first group of questions. The computing system generates a first benchmarking report based on each said response.

40 Claims, 10 Drawing Sheets

4.2 Procure material and services 4.2.1 Develop scuring strategies 4.2.1.1 Develop procurement plan
        4.2.1.2 Clarify purchasing requirements
        4.2.1.3 Match needs to supply capabilities
        4.2.1.4 Analyze company's spend profile
        4.2.1.5 Seek opportunities to improve efficiency and value 4.2.2 Select suppliers and develop/maintain contracts 4.2.2.1 Identify suppliers
        4.2.2.2 Certify and validate suppliers
        4.2.2.3 Negotiate contracts
        4.2.2.4 Manage contracts 4.2.3 Order materials and services 4.2.3.1 Process/review requisitions
        4.2.3.2 Approve requesitions
        4.2.3.3 Solicit/track vendor quotes
        4.2.3.4 Create/distribute purchase order
        4.2.3.5 Expedite orders and satisfy inquiries
        4.2.3.4 Create/distribute purchase orders
        4.2.3.5 Expedite orders and satisfy inquiries 4.2.4 Appraise and develop suppliers 4.2.4.1 Monitor/manage supplier information
        4.2.4.2 Prepare/analyze spending and vendor performance
        4.2.4.3 Support inventory and production processes

FIG. 3

Manage business sites
Site 8 – Dummy data site for demonstration, Instance 40

Step 1: Complete profile | Step 2: Select surveys
Step 3: Add users | Step 4: Activate business site Complete the following profile questions for Site 8 – Dummy data site for demonstration, Instance 40 and then click Save.

Required fields are marked with an astriisk (*) and must be filled in.

 Save

Major industry best described processes performed by your site

| Select a major industry ∨ | 

Minor industry best described processes performed by your site

| Select a minor industry ∨ |

Region where your employees primary work

| Select a region ∨ | 

Country where your employees primary work

| Select a country ∨ |

* Currency

| US Dollars ∨ |

FIG. 4

Manage business sites
Site 8 – Dummy data site demonstration, Instance 40

---

Step 1: Complete profile  |  Step 2: Select surveys
Step 3: Add users  |  Step 4: Activate business site

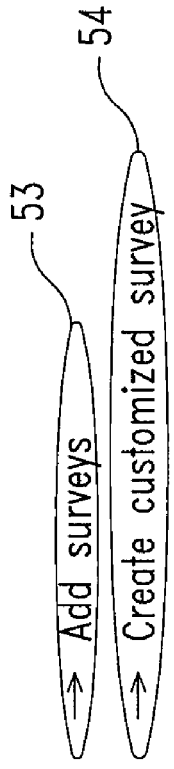

— 53 Add surveys
— 54 Create customized survey

Site 8 – Dummy data site for demonstration, Instance 40 has selected the following surveys to complete.

Note: When data is submitted for reporting, surveys are automatically locked.

| Process Classification Framework (PCF) Surface for Finance | Locked? | Edit name | Remove | Print survey |
|---|---|---|---|---|

FIG. 5

Manage business sites
Site 8 – Dummy data site demonstration, Instance 40 : add surveys Select additional surveys for your business site and click Finish. You are not able to remove existing survey selections on this screen, you must use the Removers link from the previous screen for this purpose.

→ Finish  ⊗ Cancel

Page 1 of 3     | 1 2 3 |     Next >

Available Surveys

☐ Select all Surveys

Process Classification Framework (PCF) Surveys for Finance.
- ☑ Finance Organization Business Site
- ☑ Finance Diagnostic
- ☑ General Accounting and Reporting
- ☑ Accounts Payable and Expense Reimbursements
- ☑ Revenue Accounting (Order to Cash)
- ☑ Planning and Management Accounting
- ☑ Fixed Assets
- ☑ Payroll

Process Classification Framework (PCF) Surveys for CRM.
- ☑ Business Site
- ☑ Customer Order Management
- ☐ Customer Order Management (Value Chain Version)

Process Classification Framework (PCF) Surveys for Supply Chain
- ☑ Business Site
- ☐ Supply Chain Diagnostic
- ☐ Procurement
- ☐ Procurement (Value Chain Version)

FIG. 6

Manage business sites
Site 8 – Dummy data site demonstration, Instance 40 : Create a customized survey To create your own survey for site 8 – Dummy data site for demonstration, Instance 40 you must name the survey and select at least one function. When you are finished click Continue.

Survey Name [ ———58

→ Continue    ⊗ Cancel

Available functions

Select all  Functions

Business site
2.5 Design Products and Services
3.0 Market and sell Products and Services
4.1 Supply Chain Planning
4.2 Procure Materials and Services
4.3 Produce/Manufacture/Deliver Product
4.5 Manage Logistics and Warehousing
6.0 Develop and Manage Human Capital
8.0 Manage Financial Resources
8.1 Planning and Performance Management
8.2 Revenue Accounting (Order to Cash)
8.3 General Accounting and Reporting
8.4 Manage Fined Assets
8.5 Payroll Cycle
8.6 Cash Disbursement
8.7 Manage Treasury Operations

Manage business sites
Site 8 – Dummy data site for demonstration, Instance 40 : Create a customized survey Step 2 of 3: Select processes Survey Name: procurement Select at least one process for each function. One function is already selected for you; to select another function, change the selection in the drop-down list. When you are finished, click Continue.

↓ Back    → Continue    ⊗ Cancel

| Function |
|---|
| 4.2 Procure Materials and Services    ⌄ |

— 63

Select all Processes

☐ ☐ ☐ ☐ ☐ ☐ ☐
  4.2.0 Procure Materials and Services
  4.2.1 Develop Sourcing Strategies
  4.2.2 Select Suppliers and Develop/Maintain Contracts
  4.2.3 Order Materials and Services
  4.2.4 Appraise and Develop Suppliers
        Procurement

60 ↗

↓ Back    → Continue    ⊗ Cancel

FIG. 8

Manage business sites
Site 8 - Dummy data site for demonstration, Instance 40: Create a customized survey Step 3 of 3: Optional :Select reporting outcomes Survey Name: procurement If desired, select reporting outcomes for each function and its processes.
To select another function, make a selection from drop-down list.
When you are finished, click Continue.

(←) Back    (→) Continue    (X) Cancel
                    65              66

Function

| 4.2 Procure Materials and Services            ∨ |

Select all    Reporting outcomes (4.2.1 Develop Sourcing Strategies)

☐  Measures

☐  Total cost of the process "develop sourcing strategies" per $ 1.000 revenue.

☐  Total cost of the process "develop sourcing strategies" per $ 1.000 purchases..

☐  Total cost of the process "develop sourcing strategies" per $ 1.000 cost of continuing operations.

☐  Personnel cost (including benefits) of the process "develop sourcing strategies" per $ 1.000 revenue ☐  Personnel cost (including benefits) of the process "develop sourcing strategies" per $ 1.000 perchases ☐  Personnel cost (including benefits) of the process "develop sourcing strategies" per $ 1.000 cost of continuing operations.

CUSTOM SURVEY GENERATION METHOD AND SYSTEM

FIELD OF INVENTION

The present invention relates to a system and associated method for generating surveys on demand for a user.

BACKGROUND OF THE INVENTION

Generating custom business documents typically requires a series of steps that may be complicated and inaccurate. Accordingly, there exists a need in the art to overcome the deficiencies and limitations described herein above.

SUMMARY OF THE INVENTION

The present invention provides a custom survey generation method within a computing system, said computing system comprising a memory device, said memory device comprising a list comprising business processes, reporting outcomes, and groups of questions, each business process associated with at least one reporting outcome of said reporting outcomes, each group of questions of said groups of questions associated with a different reporting outcome of said reporting outcomes, said method comprising:

presenting, by said computing system to a first user of said computing system, said business processes from said list;

receiving, by said computing system from said first user, a selection for a first business process of said business processes;

presenting, by said computing system to said first user, a first group of reporting outcomes of said reporting outcomes, said first group of reporting outcomes associated with said first business process;

receiving, by said computing system from said first user, a selection for a first reporting outcome of said first group of reporting outcomes;

generating, by said computing system, a first custom survey for said first user in response to said selection for said first reporting outcome, said first custom survey comprising a first group of questions from of said groups of questions, said first group of questions associated with said first reporting outcome;

receiving, by said computing system from said first user, a response to each question of said first group of questions; and generating, by said computing system, a first benchmarking report based on each said response to each said question of said first group of questions.

The present invention provides a computing system comprising a processor coupled to a computer-readable memory unit, said memory unit comprising instructions that when executed by the processor implement a custom survey generation method and a list comprising business processes, reporting outcomes, and groups of questions, each business process associated with at least one reporting outcome of said reporting outcomes, each group of said groups of questions associated with a different business process of said list, said method comprising:

presenting, by said computing system to a first user of said computing system, said business processes from said list;

receiving, by said computing system from said first user, a selection for a first business process of said business processes;

presenting, by said computing system to said first user, a first group of reporting outcomes of said reporting outcomes, said first group of reporting outcomes associated with said first business process;

receiving, by said computing system from said first user, a selection for a first reporting outcome of said first group of reporting outcomes;

generating, by said computing system, a first custom survey for said first user in response to said selection for said first reporting outcome, said first custom survey comprising a first group of questions from of said groups of questions, said first group of questions associated with said first reporting outcome;

receiving, by said computing system from said first user, a response to each question of said first group of questions; and generating, by said computing system, a first benchmarking report based on each said response to each said question of said first group of questions.

The present invention provides a computer program product comprising a computer usable medium comprising a computer readable program code embodied therein and a list comprising business processes, reporting outcomes, and groups of questions, each business process associated with at least one reporting outcome of said reporting outcomes, each group of said groups of questions associated with a different business process of said list, said computer readable program code adapted to implement a custom generation method within a computing system, said method comprising:

presenting, by said computing system to a first user of said computing system, said business processes from said list;

receiving, by said computing system from said first user, a selection for a first business process of said business processes;

presenting, by said computing system to said first user, a first group of reporting outcomes of said reporting outcomes, said first group of reporting outcomes associated with said first business process;

receiving, by said computing system from said first user, a selection for a first reporting outcome of said first group of reporting outcomes;

generating, by said computing system, a first custom survey for said first user in response to said selection for said first reporting outcome, said first custom survey comprising a first group of questions from of said groups of questions, said first group of questions associated with said first reporting outcome;

receiving, by said computing system from said first user, a response to each question of said first group of questions; and generating, by said computing system, a first benchmarking report based on each said response to each said question of said first group of questions.

The present invention provides a process for integrating computing infrastructure, comprising integrating computer-readable code into a computer system, wherein the computer system comprises a computer usable medium, wherein said computer usable medium comprises a list comprising business processes, reporting outcomes, and groups of questions, each business process associated with at least one reporting outcome of said reporting outcomes, each group of said groups of questions associated with a different business process of said list, and wherein the code in combination with the computer system is capable of performing a method comprising:

presenting, by said computing system to a first user of said computing system, said business processes from said list;

receiving, by said computing system from said first user, a selection for a first business process of said business processes;

presenting, by said computing system to said first user, a first group of reporting outcomes of said reporting outcomes, said first group of reporting outcomes associated with said first business process;

receiving, by said computing system from said first user, a selection for a first reporting outcome of said first group of reporting outcomes;

generating, by said computing system, a first custom survey for said first user in response to said selection for said first reporting outcome, said first custom survey comprising a first group of questions from of said groups of questions, said first group of questions associated with said first reporting outcome;

receiving, by said computing system from said first user, a response to each question of said first group of questions; and generating, by said computing system, a first benchmarking report based on each said response to each said question of said first group of questions.

The present invention advantageously provides a simple method and associated system capable generating custom business documents.

BRIEF DESCRIPTION OF THE DRAWINGS

FIGS. 3-9 illustrate examples of a computer screen shots associated with various steps in the algorithm of FIG. 2, in accordance with embodiments of the present invention.

DETAILED DESCRIPTION OF THE INVENTION

Figure 1:
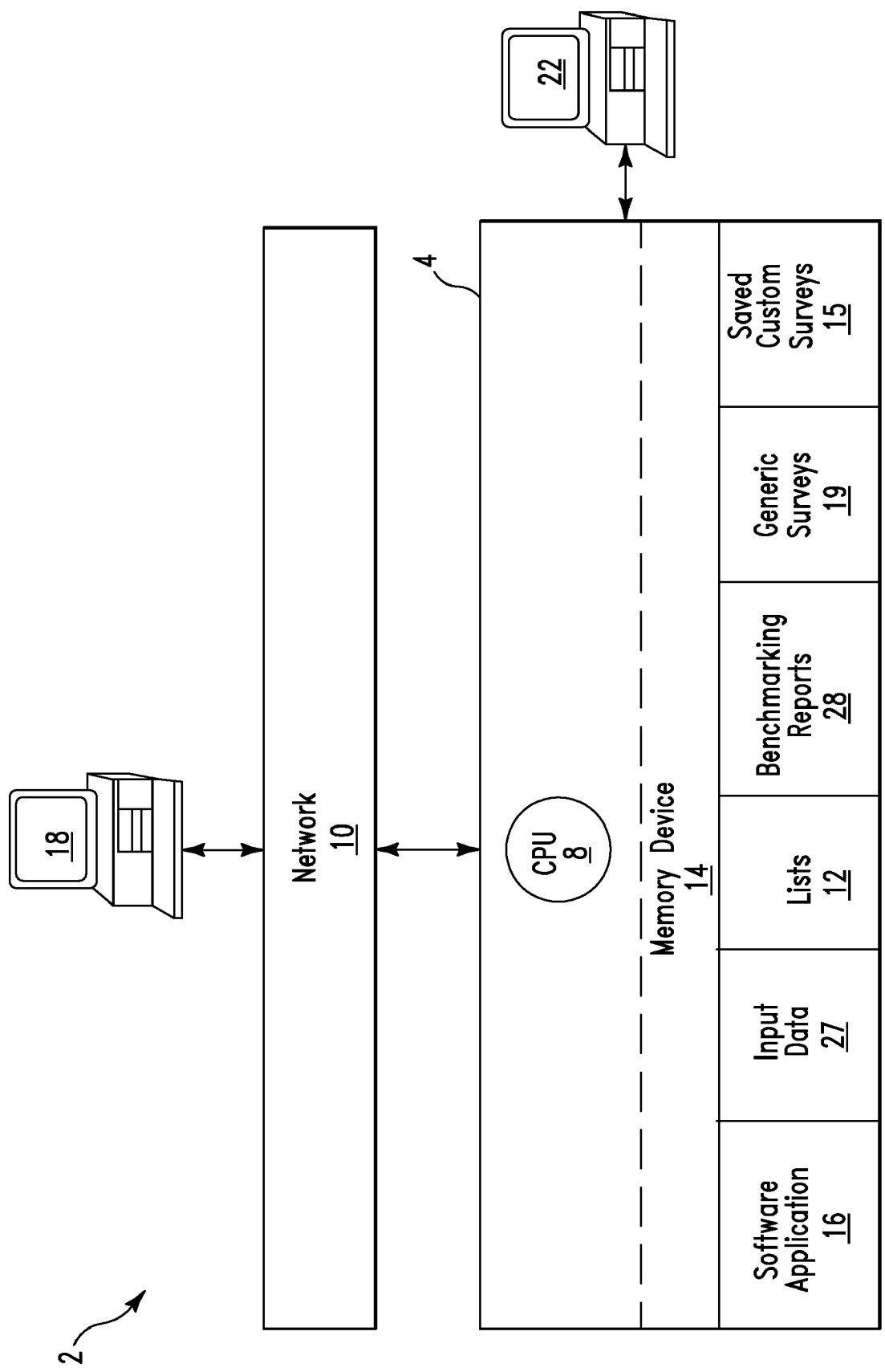
FIG. 1 illustrates a block diagram of a system for generating custom surveys on demand and producing benchmarking reports based on responses to the custom surveys, in accordance with embodiments of the present invention.

FIG. 1 illustrates a block diagram of a system 2 for generating custom surveys on demand and producing benchmarking reports based on responses (i.e., answers) to the custom surveys, in accordance with embodiments of the present invention. System 2 generates custom surveys in real time on demand (i.e., immediately as requested) using only a set of questions required to create selected reporting outcomes (i.e., outputs from a survey process including measures and business drivers). A user accesses system 2 to review categories in open standards process framework, select a process area that is of interest, review all available measures and business drivers, and select only a set of measures and business drivers that are of interest to the user. For example, a user picks 1 measure (e.g., a total cost of finance function). The generated custom survey may include 10 questions related to cost for various areas such as, inter alia, general accounting, reporting, profitability, cost management, etc. The user did not have to know that he/she needed these 10 questions in order to get the measure. He/she only needed to select the measure (i.e., outcome) that he/she wanted. The custom surveys are generated based on user desired functions, business processes, and benchmarking/reporting outcomes (e.g., measures, business drivers, etc). A custom survey is defined herein as a set of questions that are grouped together into a survey by a user through selections of reporting outcomes that are required in the user's benchmark report. A benchmark report is a final survey deliverable provided to a user that compares their values for reporting outcomes to other user's values in the survey database (e.g., memory device 14). A function is defined herein as a collection of processes representing a general collection of business activities that share a common attribute or conceptual scheme. For example procure materials and services may be a function. A business process is defined herein as a series of interrelated activities that convert inputs (e.g., input data) into results (outputs). A business process may consume resources and require standards for repeatable performance. Business processes respond to control systems that direct the quality, rate, and cost of performance. For example, order materials and services may be a process. A measure is defined herein as a set of rules that are applied to answers in response to questions. Each measure comprises a formula specifying a question or combination of questions that are used to compute measure values for each measure. For example, a measure may comprise "Total cost of financial reporting per $1,000 revenue." This measure's formula would comprise:

(Personnel cost of financial reporting+systems cost of financial reporting+overhead cost of financial reporting+outsourced cost of financial reporting+ "other" cost of financial reporting)/total annual revenue.

Measures are typically normalized. Measures comprise a directional value that indicates better performance. For example, in a case of cost measures a lower value is preferable to a higher value and in a case of productivity measures a higher value is preferable to a lower value. Measure values are always numeric. A measure value operates on questions that are numerical, percentage, or currency (i.e., monetary) related.

A business driver is defined herein as an enabler of business process performance such as, inter alia, technology, organizational structure, culture etc. Business drivers may include system profiles, analysis of resource activities, distribution of costs or resource by components, methods/approaches used to enable the business process, etc. A business driver may comprise a set of rules that are applied to specified business driver answers in order to compute a business driver value. Examples of business drivers may include:

1. Distribution of a total cost of the process "develop sourcing strategies" by an individual cost element.
2. System/software used for the process "order materials/services".
3. Value analysis of activity for the process "order materials/services".
4. Percentage of annual purchase value by type of purchase arrangement.
5. Profile of the roles performed in each procurement cycle business process for all companies.

A question (i.e., with respect to a survey) is defined herein as a rule that controls treatment and storage of answers. In addition to supplying the question text, questions have rules that control treatment and display of answers. A question may be displayed in more than one survey. Questions may be re-used in multiple surveys. When a question is used in multiple surveys, it is still treated as one individual data point. For example, if a question exists in two user generated surveys and a user answers the question in one of the two user generated surveys then that same answer will show up pre-populated for the user in the other survey. This also relates to answer changes. An answer that is changed in one survey is changed in all surveys.

System 2 comprises computing system 4, an input terminal 18, an input terminal 22, and a network 10. Network 10 may comprise any type of network known to one skilled in the art including, inter alia, a local area network, (LAN), a wide area network (WAN), the Internet, etc. Input terminal 18 may comprise any type of computing apparatus including, inter alia, a personal computer (PC), a laptop computer, a personal digital assistant (PDA), etc. Input terminal 22 may comprise any type of computing apparatus including, inter alia, a personal computer (PC), a laptop computer, a PDA, etc. Computing system 4 comprises a central processing unit (CPU) 8 and a memory device 14. The memory device 14 comprises a software application 16, input data 27, selection lists 12 associated with input data 27, pre-generated generic surveys 19, saved custom surveys 15, and generated benchmarking reports 28. Input data 27 comprises functions, business processes, benchmarking/reporting outcomes (e.g., measures, business drivers, etc), and related questions for generating the surveys. Input data 27 may be entered into computing system 4 using input terminal 18 or input terminal 22. Input terminal 18 is connected to computing system 4 through network 10.

Computing system 4 executes software application 16. Software application 16 uses selected (i.e., by a user and selected using one or more of lists 12) portions of input data 27 to generate a custom survey(s) for the user. Additionally, the user may choose to receive a pre-generated generic survey 19 in addition to or instead of a custom survey. The user provides responses to questions from the surveys (i.e., custom survey(s) and/or pre-generated generic survey 19) and software application 16 generates benchmarking reports 28 based on the responses. In order to initiate a custom survey generation process, a user may be required to log into computing system 4 (e.g., using terminal 18 or 22). Software application 16 allows the user to review and agree to terms and conditions associated with completing a survey(s) (e.g., a custom survey (s) and/or a pre-generated generic survey 19) and receiving a benchmark report 28. Software application 16 provides users a choice between answering one or more pre-generated generic survey 19 and/or creating their own custom survey(s). When a custom survey(s) is selected, software application 16 provides the user with the ability to select questions to answer based on desired reporting outcomes. The user is presented with three options (i.e., for desired reporting outcomes) as follows:

1. View and select function(s).
2. View and select process(es) associated with selected functions.
3. View and select reporting outcomes (e.g. measures, business drivers, etc.) that are configured to appear and are associated with selected process(es).

The user views and selects any or all of the above three options via user terminal 18 and/or 22. Upon receiving the selections for the desired reporting outcomes, a custom survey comprising associated questions is generated by software application 16. System 2 may save generated custom surveys in memory device 14 so that the same custom survey may be presented to the user each time he/she logs into system 2. If the user selects an entire process for completion, then all questions associated with reporting outcomes configured to appear in that process will be included in the custom survey. If the user makes a more specific selection of specific reporting outcomes (e.g. measures, business drivers, etc.) then only questions associated with these elements will be included in the survey. If the user selects an entire function and makes no further selections, this may correspond to one of pre-generated generic surveys 19 and not a custom survey.

An example for implementation of software application 16 to generate a custom survey is described as follows:

A company would like to compare their organizational performance to other organizations in the company database for a functional area of procurement. A user from the company logs into computing apparatus 4 (i.e., through terminal 18 or 22), reviews categories in the open standards process framework, and selects the function and processes of interest. For example, the user selects the function: Procure materials and Services and the processes: Develop sourcing strategies. The user opens enables software application 16 and logs in. The user completes a profile and decides to create a custom survey based on measures that they would like to evaluate. Within software application 16, the user selects a custom survey option, names the survey "procurement", and selects a function: Procure materials and services. Software application 16 provides a list (e.g., from lists 12) of processes associated with the selected function for the user. The user a process: Develop sourcing strategies. Software application 16 provides list (e.g., from lists 12) of available reporting outcomes including measures and business drivers for the selected process. The user selects measures such as "Total cost of the process "develop sourcing strategies" per $1,000 revenue". Software application 16 generates a survey comprising all questions required to be answered in order to produce the selected measure. The survey may include six questions to capture personnel cost, overhead cost, systems cost, outsourcing costs and other costs for the process develop sourcing strategies as well at total revenue for normalizing the measure. The user did not have to know they needed these six questions in order to get the selected measure. They only needed to select the measure they wanted to compare.

Figure 2:
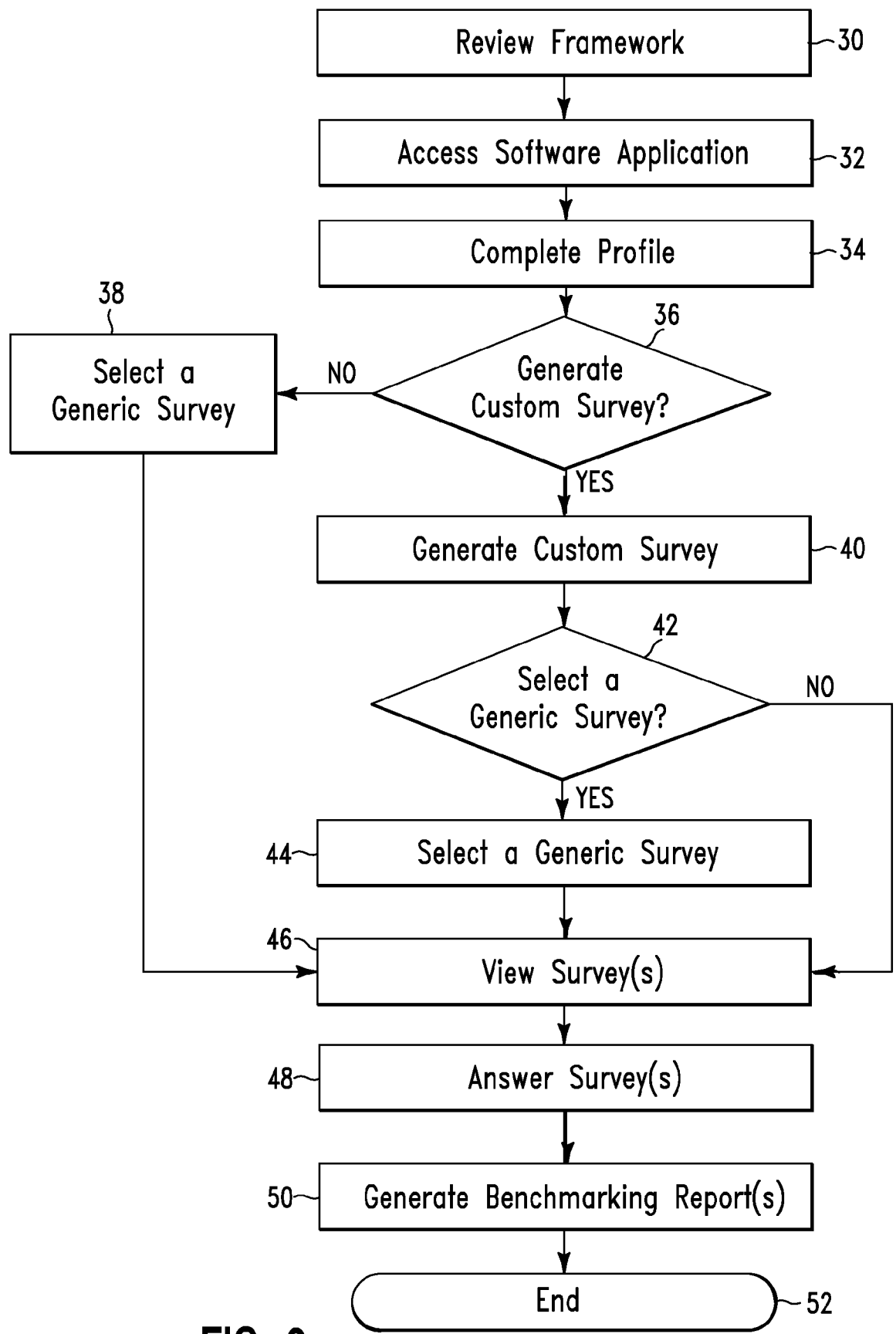
FIG. 2 illustrates a flowchart describing an algorithm used by the software application in system 2 of FIG. 1 to generate custom surveys and generate benchmarking reports, in accordance with embodiments of the present invention.

FIG. 2 illustrates a flowchart describing an algorithm used by software application 16 in system 2 of FIG. 1 to generate custom surveys and generate benchmarking reports 28, in accordance with embodiments of the present invention. In step 30, a user will review categories in the process framework and select an area that is of interest for obtaining performance related data. For example, the user may select "4.2 Procure materials and services" (e.g., see screen shot in FIG. 3). In step 32, software application 16 is accessed and enabled. Software application may be web based and secured by id and password authentication. In step 34, the user will complete a user profile by answering questions (i.e., generated by software application 16) about their organization (i.e., portion of a business). In step 36, the user determines if they would like to generate a custom survey.

If in step 36, the user determines that they would not like to generate a custom survey then in step 38, the user selects a generic survey and the process executes step 46 as described, infra.

If in step 36, the user determines that they would like to generate a custom survey then in step 40, the user generates a custom survey. The custom survey generation process comprises selecting (i.e., by the user) functions they are interested in surveying. Software application 16 will provide a selection of processes based on the selected functions. The user will select processes. Software application 16 will provide a selection of reporting outcomes based on the selected processes. The user will select reporting outcomes (e.g., measures, business drivers, etc). Software application 16 will generate the custom survey in real time based on the criteria selected by the user. In step 42, the user determines if they would like to select a generic survey (i.e., in addition to the custom survey).

If in step 42, the user determines that they would not like to select a generic survey (i.e., in addition to the custom survey) then the process executes step 46 as described, infra.

If in step 42, the user determines that they would like to select a generic survey (i.e., in addition to the custom survey) then in step 44, the user selects a generic survey.

In step 46, software application 16 presents all selected surveys (i.e., custom, generic, or custom and generic). In step 48, the user answers all questions in the surveys. In step 50, software application 16 generates a benchmarking report from the user answers from step 48 and the process terminates in step 52.

FIG. 3 illustrates an example of a PDF document displayed on a computer screen (e.g., displayed on terminal 18 or 22 of FIG. 1) associated with step 30 of FIG. 2, in accordance with embodiments of the present invention. The PDF document illustrated in FIG. 3 may be launched from the software application 16. The example illustrated in FIG. 3 is a framework for an open standard enterprise model of business processes. The model comprises categories, process groups, processes, activities, and tasks. A user would review the framework and select an area of interest. As described with reference to FIG. 1 in the example of implementation the user may select 4.2 "Procure materials and services".

FIG. 4 illustrates an example of a computer screen shot (e.g., displayed on terminal 18 or 22 of FIG. 1) associated with step 34 of FIG. 2, in accordance with embodiments of the present invention. In FIG. 4, the user will complete a profile panel by answering questions about their organization (i.e. "business site"). The profile data includes currency selection and some high-level peer group questions such as industry and region.

FIG. 5 illustrates an example of a computer screen shot (e.g., displayed on terminal 18 or 22 of FIG. 1) associated with step 36 of FIG. 2, in accordance with embodiments of the present invention. The computer screen shot illustrated in FIG. 5 is generated by software application 16. In FIG. 5, the user has the option of selecting a generic survey 53 or a custom survey 54.

FIG. 6 illustrates an example of a computer screen shot (e.g., displayed on terminal 18 or 22 of FIG. 1) associated with step 38 or 44 of FIG. 2, in accordance with embodiments of the present invention. The computer screen shot illustrated in FIG. 6 is generated by software application 16. In FIG. 6, the user may select the appropriate generic surveys from the list by selecting a checkbox 55 next to each survey they want to answer. Surveys may be selected individually or the user may check the select all checkbox at the top of the list to select all of the surveys. By using the generic surveys, the user will be able to answer all questions that are associated with the selected survey(s).

FIG. 7 illustrates an example of a computer screen shot (e.g., displayed on terminal 18 or 22 of FIG. 1) associated with step 40 of FIG. 2, in accordance with embodiments of the present invention. The computer screen shot illustrated in FIG. 7 is generated by software application 16. If in step 36 of FIG. 2 the generic surveys do not meet user's needs a custom survey may be generated based on desired reporting outcomes. The user will choose the reporting outcomes and software application 16 will automatically determine the questions that the user must answer based on their selections. The user may name the custom survey in the survey name box 58. The user may select from functions 59.

FIG. 8 illustrates an example of a computer screen shot (e.g., displayed on terminal 18 or 22 of FIG. 1) associated with step 40 of FIG. 2, in accordance with embodiments of the present invention. The computer screen shot illustrated in FIG. 8 is generated by software application 16. Based on functions 59 selected in FIG. 7, software application 16 will generate the associated processes 60. The user may select at least one process 60 for each function 59 that they previously selected. Processes 60 are selected by selecting the corresponding check box. The Function drop-down list 63 is used to switch between functions 59.

FIG. 9 illustrates an example of a computer screen shot (e.g., displayed on terminal 18 or 22 of FIG. 1) associated with step 40 of FIG. 2, in accordance with embodiments of the present invention. Based on functions 59 selected in FIG. 7 software application 16 will generate the associated reporting outcomes (i.e. measures, business drivers, profiles etc.). The user has the option to select reporting outcomes for each function by selecting the corresponding check box. The following steps are taken:
1. Select reporting outcomes 64 by selecting the corresponding check box.
2. Use the function drop-down list 66 to switch between functions.
3. Click Continue 65 once all reporting outcomes have been selected.

Figure 10:
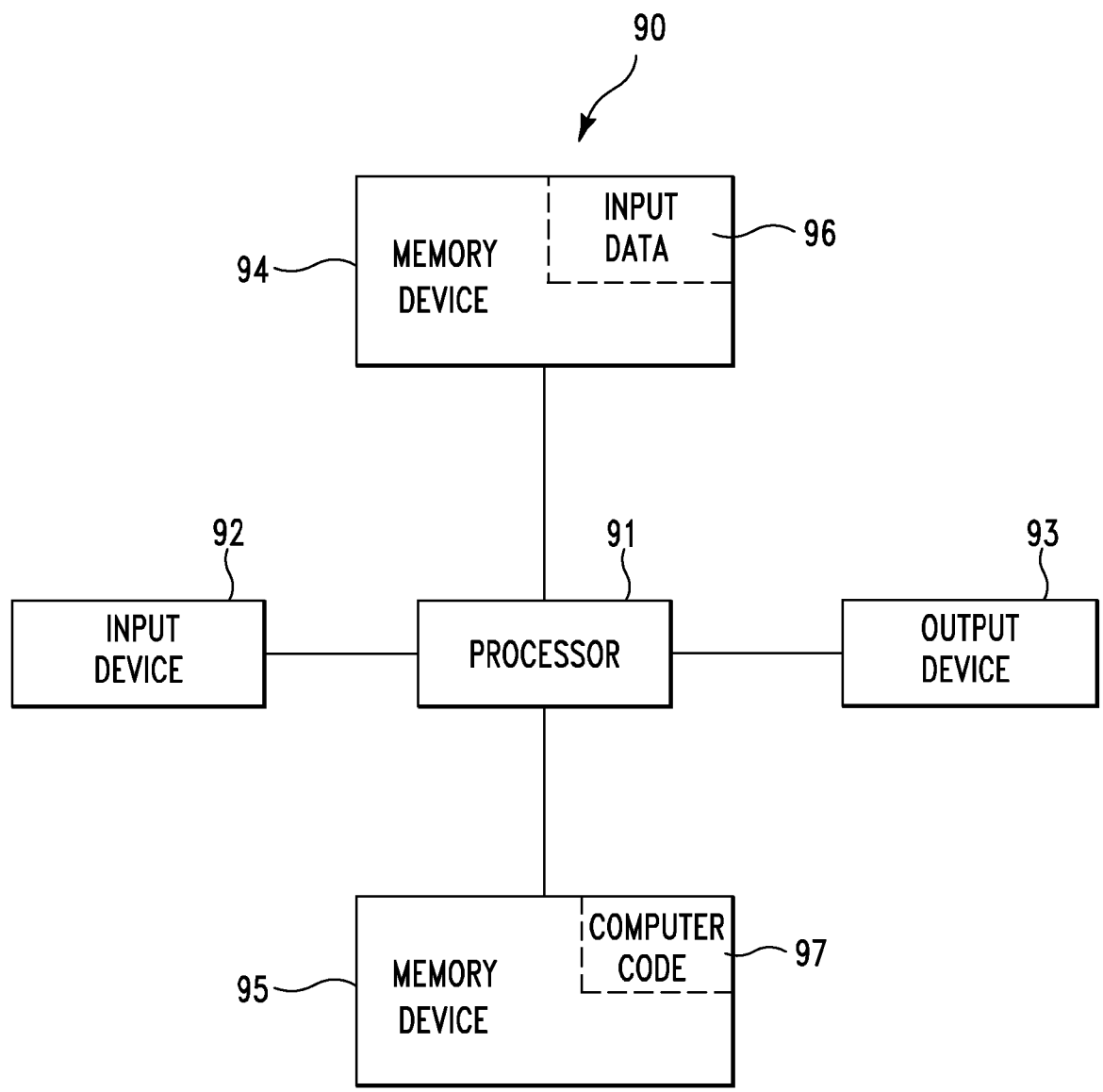
FIG. 10 illustrates a computer system used to generate custom surveys and generate benchmarking reports 28, in accordance with embodiments of the present invention.

FIG. 10 illustrates a computer system 90 (i.e., computing system 4 in FIG. 1) used to generate custom surveys and generate benchmarking reports 28, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm (e.g., algorithm of FIG. 2) to generate custom surveys and generate benchmarking reports 28. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 10) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to provide a service to generate custom surveys and generate benchmarking reports 28. Thus the present invention discloses a process for deploying or integrating computing infrastructure, comprising integrating computer-readable code into the computer system 90, wherein the code in combination with the computer system 90 is capable of performing a method to generate custom surveys and generate benchmarking reports 28. In another embodiment, the invention provides a business method that performs the process steps of the invention on a subscription, advertising, and/or fee basis. That is, a service provider, such as a Solution Integrator, could offer to generate custom surveys and generate benchmarking reports 28. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A custom survey generation method within a computing system, said computing system comprising a computer processor and a memory device, said memory device comprising a list comprising business processes, reporting outcomes, and groups of questions, each business process associated with at least one reporting outcome of said reporting outcomes, each group of questions of said groups of questions associated with a different reporting outcome of said reporting outcomes, said method comprising:
   first presenting, by said computing system to a first user of said computing system, a plurality of categories associated with said business processes;
   second presenting, by said computing system to said first user of said computing system, said business processes from said list;
   receiving, by said computing system from said first user in response to said first presenting and said second presenting, a selection for a process area of interest and an associated selection for a first business process of said business processes;
   receiving, by said computing system from said first user, a selection of set of normalized measures associated with said reporting outcomes and a selection of business drivers associated with interests of said first user, wherein said set of normalized measures are associated with a finance function, wherein said measures comprise numeric measure values that operate on questions associated with percentages or currency, wherein said normalized measures comprise rules that are applied to answers in response to said questions, and wherein said normalized measures are associated with said first business process;
   presenting, by said computing system to said first user, a first group of reporting outcomes of said reporting outcomes, said first group of reporting outcomes associated with said first business process;
   receiving, by said computing system from said first user, a selection for a first reporting outcome of said first group of reporting outcomes;
   generating in real time on demand, by said computer processor of said computing system, a first custom survey for said first user in response to said selection for said first reporting outcome, said first custom survey comprising a first group of questions from said groups of questions, said first group of questions associated with said first reporting outcome;
   receiving, by said computing system from said first user, a response to each question of said first group of questions; and
   generating, by said computing system, a first benchmarking report based on each said response to each said question of said first group of questions.

2. The method of claim 1, wherein said first reporting outcome comprises a business measure.

3. The method of claim 1, wherein said first reporting outcome comprises a business driver.

4. The method of claim 1, further comprising:
   receiving, by said computing system from said first user, a selection for a second reporting outcome of said first group of reporting outcomes, wherein said generating said first custom survey is in further response to said selection for said second reporting outcome, said first custom survey further comprising a second group of questions of said groups of questions, said second group of questions associated with said second reporting outcome; and
   receiving, by said computing system from said first user, a response to each question of said second group of questions, wherein said generating said first benchmarking report is further based on each said response to each said question of said second group of questions.

5. The method of claim 4, wherein said first reporting outcome comprises a business measure, and wherein said second reporting outcome comprises a business driver.

6. The method of claim 1, further comprising:
   receiving, by said computing system from said first user, a selection for a second business process of said business processes;
   presenting, by said computing system to said first user, a second group of reporting outcomes of said reporting outcomes, said second group of reporting outcomes associated with said second business process;
   receiving, by said computing system from said first user, a selection for a second reporting outcome of said second group of reporting outcomes, wherein said generating said first custom survey is in further response to said selection for said second reporting outcome, said first custom survey further comprising a second group of question of said groups of questions, said second group of questions associated with said second reporting outcome; and
   receiving, by said computing system from said first user, a response to each question of said second group of questions, wherein said generating said first benchmarking report is further based on each said response to each said question of said second group of questions.

7. The method of claim 1, further comprising:
   presenting, by said computing system to a second user of said computing system, said business processes from said list;
   receiving, by said computing system from said second user, a selection for a second business process of said business processes;
   presenting, by said computing system to said second user, a second group of reporting outcomes of said reporting outcomes, said second group of reporting outcomes associated with said second business process;
   receiving, by said computing system from said second user, a selection for a second reporting outcome of said second group of reporting outcomes;

generating, by said computing system, a second custom survey for said second user in response to said selection of said second reporting outcome, said second custom survey comprising a second group of questions of said groups of questions, said second group of questions associated with said second reporting outcome, said second group of questions comprising different questions from said first group of questions;

receiving, by said computing system from said first user, a response to each question of said second group of questions; and generating, by said computing system, a second benchmarking report based on each said response to each said question of said second group of questions.

8. The method of claim 1, wherein said memory device further comprises a plurality of pre-generated surveys, wherein each survey of said plurality of pre-generated surveys comprises at least one associated question, and wherein said method further comprises:

presenting, by said computing system to said first user, at least one survey of said plurality pre-generated surveys;

receiving, by said computing system from said first user, a response to said least one associated question from said least one survey; and generating, by said computing system, a second benchmarking report based said response to said least one associated question.

9. The method of claim 1, further comprising:

assigning, by said computing system, a name to said first custom survey.

10. The method of claim 9, further comprising:

saving, by said computing system, said first custom survey within said memory device.

11. A computing system comprising a computer processor coupled to a computer-readable memory unit, said memory unit comprising instructions that when executed by the processor implement a custom survey generation method and a list comprising business processes, reporting outcomes, and groups of questions, each business process associated with at least one reporting outcome of said reporting outcomes, each group of said groups of questions associated with a different business process of said list, said method comprising:

first presenting, by said computing system to a first user of said computing system, a plurality of categories associated with said business processes;

second presenting, by said computing system to said first user of said computing system, said business processes from said list;

receiving, by said computing system from said first user in response to said first presenting and said second presenting, a selection for a process area of interest and an associated selection for a first business process of said business processes;

receiving, by said computing system from said first user, a selection of set of normalized measures associated with said reporting outcomes and a selection of business drivers associated with interests of said first user, wherein said set of normalized measures are associated with a finance function, wherein said measures comprise numeric measure values that operate on questions associated with percentages or currency, wherein said normalized measures comprise rules that are applied to answers in response to said questions, and wherein said normalized measures are associated with said first business process;

presenting, by said computing system to said first user, a first group of reporting outcomes of said reporting outcomes, said first group of reporting outcomes associated with said first business process;

receiving, by said computing system from said first user, a selection for a first reporting outcome of said first group of reporting outcomes;

generating in real time on demand, by said computer processor of said computing system, a first custom survey for said first user in response to said selection for said first reporting outcome, said first custom survey comprising a first group of questions from of said groups of questions, said first group of questions associated with said first reporting outcome;

receiving, by said computing system from said first user, a response to each question of said first group of questions; and generating, by said computing system, a first benchmarking report based on each said response to each said question of said first group of questions.

12. The computing system of claim 11, wherein said first reporting outcome comprises a business measure.

13. The computing system of claim 11, wherein said first reporting outcome comprises a business driver.

14. The computing system of claim 11, wherein said method further comprises:

receiving, by said computing system from said first user, a selection for a second reporting outcome of said first group of reporting outcomes, wherein said generating said first custom survey is in further response to said selection for said second reporting outcome, said first custom survey further comprising a second group of questions of said groups of questions, said second group of questions associated with said second reporting outcome; and receiving, by said computing system from said first user, a response to each question of said second group of questions, wherein said generating said first benchmarking report is further based on each said response to each said question of said second group of questions.

15. The computing system of claim 14, wherein said first reporting outcome comprises a business measure, and wherein said second reporting outcome comprises a business driver.

16. The computing system of claim 11, wherein said method further comprises:

receiving, by said computing system from said first user, a selection for a second business process of said business processes;

presenting, by said computing system to said first user, a second group of reporting outcomes of said reporting outcomes, said second group of reporting outcomes associated with said second business process;

receiving, by said computing system from said first user, a selection for a second reporting outcome of said second group of reporting outcomes, wherein said generating said first custom survey is in further response to said selection for said second reporting outcome, said first custom survey further comprising a second group of question of said groups of questions, said second group of questions associated with said second reporting outcome; and receiving, by said computing system from said first user, a response to each question of said second group of questions, wherein said generating said first benchmarking report is further based on each said response to each said question of said second group of questions.

17. The computing system of claim 11, wherein said method further comprises:

presenting, by said computing system to a second user of said computing system, said business processes from said list;

receiving, by said computing system from said second user, a selection for a second business process of said business processes;

presenting, by said computing system to said second user, a second group of reporting outcomes of said reporting outcomes, said second group of reporting outcomes associated with said second business process;

receiving, by said computing system from said second user, a selection for a second reporting outcome of said second group of reporting outcomes;

generating, by said computing system, a second custom survey for said second user in response to said selection of said second reporting outcome, said second custom survey comprising a second group of questions of said groups of questions, said second group of questions associated with said second reporting outcome, said second group of questions comprising different questions from said first group of questions;

receiving, by said computing system from said first user, a response to each question of said second group of questions; and generating, by said computing system, a second benchmarking report based on each said response to each said question of said second group of questions.

18. The computing system of claim 11, wherein said memory unit further comprises a plurality of pre-generated surveys, wherein each survey of said plurality of pre-generated surveys comprises at least one associated question, and wherein said method further comprises:

presenting, by said computing system to said first user, at least one survey of said plurality pre-generated surveys;

receiving, by said computing system from said first user, a response to said least one associated question from said least one survey; and generating, by said computing system, a second benchmarking report based said response to said least one associated question.

19. The computing system of claim 11, wherein said method further comprises:

assigning, by said computing system, a name to said first custom survey.

20. The computing system of claim 19, wherein said method further comprises:

saving, by said computing system, said first custom survey within said memory unit.

21. A computer program product comprising a computer readable storage medium comprising a computer readable program code embodied therein and a list comprising business processes, reporting outcomes, and groups of questions, each business process associated with at least one reporting outcome of said reporting outcomes, each group of said groups of questions associated with a different business process of said list, said computer readable program code comprising instructions that when executed by a computer processor of a computing system implements a custom generation method within said computing system, said method comprising:

first presenting, by said computing system to a first user of said computing system, a plurality of categories associated with said business processes;

second presenting, by said computing system to said first user of said computing system, said business processes from said list;

receiving, by said computing system from said first user in response to said first presenting and said second presenting, a selection for a process area of interest and an associated selection for a first business process of said business processes;

receiving, by said computing system from said first user, a selection of set of normalized measures associated with said reporting outcomes and a selection of business drivers associated with interests of said first user, wherein said set of normalized measures are associated with a finance function, wherein said measures comprise numeric measure values that operate on questions associated with percentages or currency, wherein said normalized measures comprise rules that are applied to answers in response to said questions, and wherein said normalized measures are associated with said first business process;

presenting, by said computing system to said first user, a first group of reporting outcomes of said reporting outcomes, said first group of reporting outcomes associated with said first business process;

receiving, by said computing system from said first user, a selection for a first reporting outcome of said first group of reporting outcomes;

generating in real time on demand, by said computer processor of said computing system, a first custom survey for said first user in response to said selection for said first reporting outcome, said first custom survey comprising a first group of questions from of said groups of questions, said first group of questions associated with said first reporting outcome;

receiving, by said computing system from said first user, a response to each question of said first group of questions; and generating, by said computing system, a first benchmarking report based on each said response to each said question of said first group of questions.

22. The computer program product of claim 21, wherein said first reporting outcome comprises a business measure.

23. The computer program product of claim 21, wherein said first reporting outcome comprises a business driver.

24. The computer program product of claim 21, wherein said method further comprises:

receiving, by said computing system from said first user, a selection for a second reporting outcome of said first group of reporting outcomes, wherein said generating said first custom survey is in further response to said selection for said second reporting outcome, said first custom survey further comprising a second group of questions of said groups of questions, said second group of questions associated with said second reporting outcome; and receiving, by said computing system from said first user, a response to each question of said second group of questions, wherein said generating said first benchmarking report is further based on each said response to each said question of said second group of questions.

25. The computer program product of claim 24, wherein said first reporting outcome comprises a business measure, and wherein said second reporting outcome comprises a business driver.

26. The computer program product of claim 21, wherein said method further comprises:

receiving, by said computing system from said first user, a selection for a second business process of said business processes;

presenting, by said computing system to said first user, a second group of reporting outcomes of said reporting outcomes, said second group of reporting outcomes associated with said second business process;

receiving, by said computing system from said first user, a selection for a second reporting outcome of said second group of reporting outcomes, wherein said generating said first custom survey is in further response to said selection for said second reporting outcome, said first custom survey further comprising a second group of question of said groups of questions, said second group of questions associated with said second reporting outcome; and receiving, by said computing system from said first user, a response to each question of said second group of questions, wherein said generating said first benchmarking report is further based on each said response to each said question of said second group of questions.

27. The computer program product of claim 21, wherein said method further comprises:

presenting, by said computing system to a second user of said computing system, said business processes from said list;

receiving, by said computing system from said second user, a selection for a second business process of said business processes;

presenting, by said computing system to said second user, a second group of reporting outcomes of said reporting outcomes, said second group of reporting outcomes associated with said second business process;

receiving, by said computing system from said second user, a selection for a second reporting outcome of said second group of reporting outcomes;

generating, by said computing system, a second custom survey for said second user in response to said selection of said second reporting outcome, said second custom survey comprising a second group of questions of said groups of questions, said second group of questions associated with said second reporting outcome, said second group of questions comprising different questions from said first group of questions;

receiving, by said computing system from said first user, a response to each question of said second group of questions; and generating, by said computing system, a second benchmarking report based on each said response to each said question of said second group of questions.

28. The computer program product of claim 21, wherein said computer usable medium further comprises a plurality of pre-generated surveys, wherein each survey of said plurality of pre-generated surveys comprises at least one associated question, and wherein said method further comprises:

presenting, by said computing system to said first user, at least one survey of said plurality pre-generated surveys;

receiving, by said computing system from said first user, a response to said least one associated question from said least one survey; and generating, by said computing system, a second benchmarking report based said response to said least one associated question.

29. The computer program product of claim 21, wherein said method further comprises:

assigning, by said computing system, a name to said first custom survey.

30. The computer program product of claim 29, wherein said method further comprises:

saving, by said computing system, said first custom survey within said computer usable medium.

31. A process for integrating computing infrastructure, comprising integrating computer-readable code into a computer system, wherein the computer system comprises a computer processor and a computer usable medium, wherein said computer usable medium comprises a list comprising business processes, reporting outcomes, and groups of questions, each business process associated with at least one reporting outcome of said reporting outcomes, each group of said groups of questions associated with a different business process of said list, and wherein the code in combination with the computer system is capable of performing a method comprising:

first presenting, by said computing system to a first user of said computing system, a plurality of categories associated with said business processes;

second presenting, by said computing system to said first user of said computing system, said business processes from said list;

receiving, by said computing system from said first user in response to said first presenting and said second presenting, a selection for a process area of interest and an associated selection for a first business process of said business processes;

receiving, by said computing system from said first user, a selection of set of normalized measures associated with said reporting outcomes and a selection of business drivers associated with interests of said first user, wherein said set of normalized measures are associated with a finance function, wherein said measures comprise numeric measure values that operate on questions associated with percentages or currency, wherein said normalized measures comprise rules that are applied to answers in response to said questions, and wherein said normalized measures are associated with said first business process;

presenting, by said computing system to said first user, a first group of reporting outcomes of said reporting outcomes, said first group of reporting outcomes associated with said first business process;

receiving, by said computing system from said first user, a selection for a first reporting outcome of said first group of reporting outcomes;

generating in real time on demand, by said computer processor of said computing system, a first custom survey for said first user in response to said selection for said first reporting outcome, said first custom survey comprising a first group of questions from of said groups of questions, said first group of questions associated with said first reporting outcome;

receiving, by said computing system from said first user, a response to each question of said first group of questions; and generating, by said computing system, a first benchmarking report based on each said response to each said question of said first group of questions.

32. The process of claim 31, wherein said first reporting outcome comprises a business measure.

33. The process of claim 31, wherein said first reporting outcome comprises a business driver.

34. The process of claim 31, wherein said method further comprises:

receiving, by said computing system from said first user, a selection for a second reporting outcome of said first group of reporting outcomes, wherein said generating said first custom survey is in further response to said selection for said second reporting outcome, said first custom survey further comprising a second group of questions of said groups of questions, said second group of questions associated with said second reporting outcome; and receiving, by said computing system from said first user, a response to each question of said second group of questions, wherein said generating said first benchmarking report is further based on each said response to each said question of said second group of questions.

35. The process of claim 34, wherein said first reporting outcome comprises a business measure, and wherein said second reporting outcome comprises a business driver.

36. The process of claim 31, wherein said method further comprises:

receiving, by said computing system from said first user, a selection for a second business process of said business processes;

presenting, by said computing system to said first user, a second group of reporting outcomes of said reporting outcomes, said second group of reporting outcomes associated with said second business process;

receiving, by said computing system from said first user, a selection for a second reporting outcome of said group of reporting outcomes, wherein said generating said first custom survey is in further response to said selection for said second reporting outcome, said first custom survey further comprising a second group of question of said groups of questions, said second group of questions associated with said second reporting outcome; and receiving, by said computing system from said first user, a response to each question of said second group of questions, wherein said generating said first benchmarking report is further based on each said response to each said question of said second group of questions.

37. The process of claim 31, wherein said method further comprises:

presenting, by said computing system to a second user of said computing system, said business processes from said list;

receiving, by said computing system from said second user, a selection for a second business process of said business processes;

presenting, by said computing system to said second user, a second group of reporting outcomes of said reporting outcomes, said second group of reporting outcomes associated with said second business process;

receiving, by said computing system from said second user, a selection for a second reporting outcome of said second group of reporting outcomes;

generating, by said computing system, a second custom survey for said second user in response to said selection of said second reporting outcome, said second custom survey comprising a second group of questions of said groups of questions, said second group of questions associated with said second reporting outcome, said second group of questions comprising different questions from said first group of questions;

receiving, by said computing system from said first user, a response to each question of said second group of questions; and generating, by said computing system, a second benchmarking report based on each said response to each said question of said second group of questions.

38. The process of claim 31, wherein said computer readable medium further comprises a plurality of pre-generated surveys, wherein each survey of said plurality of pre-generated surveys comprises at least one associated question, and wherein said method further comprises:

presenting, by said computing system to said first user, at least one survey of said plurality pre-generated surveys;

receiving, by said computing system from said first user, a response to said least one associated question from said least one survey; and generating, by said computing system, a second benchmarking report based said response to said least one associated question.

39. The process of claim 31, wherein said method further comprises:

assigning, by said computing system, a name to said first custom survey.

40. The process of claim 39, wherein said method further comprises:

saving, by said computing system, said first custom survey within said computer usable medium.

* * * * *